Patented Sept. 18, 1928.

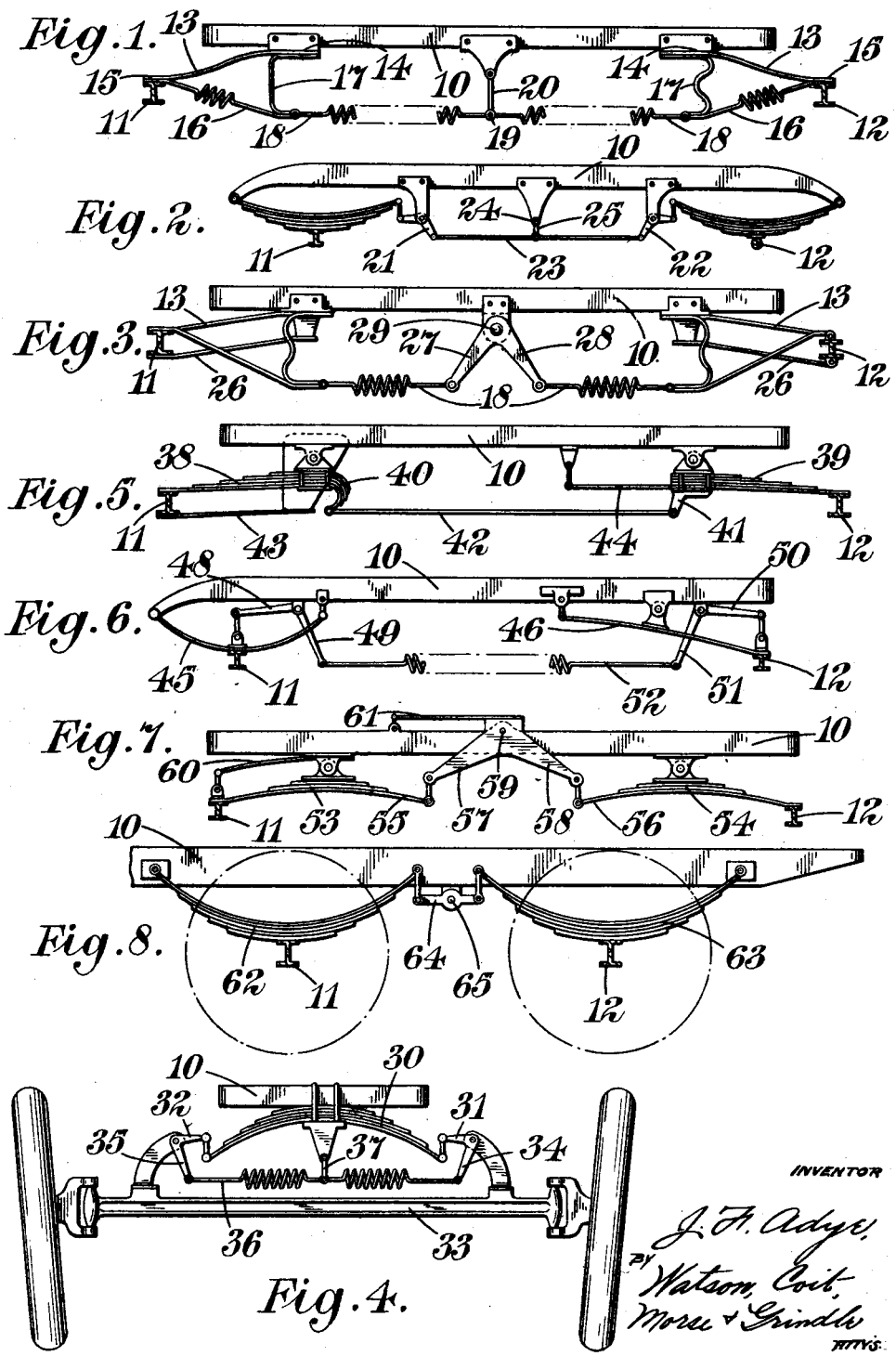

1,684,692

UNITED STATES PATENT OFFICE.

JOHN FIFIELD ADYE, OF HILTON, ENGLAND.

SPRING SUSPENSION FOR MOTOR VEHICLES.

Application filed October 21, 1925, Serial No. 63,974, and in Great Britain October 27, 1924.

This invention is for improvements in or relating to spring-suspensions for motor and like vehicles, and has for its object to provide an improved construction of the same whereby the vertical movement of any one wheel is controlled by the joint action of the springs for more than one wheel, or in other words the combined flexibilities of more than one spring are utilized jointly; this enables the displacement of the vehicle-body for any given irregularity of the surface on which it is running to be less than that obtained with other known forms of springs, or alternatively to be so modified that the discomfort of the passengers in the vehicle is reduced. A further object is to provide a construction in which the weight of the springs themselves and their associated parts whereby the vehicle-frame is supported on the axles, is less than is required with ordinary forms of springing.

A further object is to provide a combination of springs having different natural periods of oscillation controlling each axle in order to tend to prevent and damp out vibration and the natural tendency to swinging or bouncing of the vehicle. Further, provision towards this end may be made by the arrangement of a toggle leverage to portions of the springs, so as to give a varying resistance to the springs concerned which varies in a greater proportion than the normal resistance of the spring alone.

According to this invention there is provided in a vehicle, the combination with a spring for one wheel (such as a cantilever-spring for a front wheel) and a spring for another wheel (such as a rear wheel on the same side of the vehicle), of means interconnecting the said springs whereby a spring-guided and controlled vertical displacement of one wheel tends to produce a displacement of the other wheel in the opposite direction, whereby the springs of both wheels are operative to control the movement of either wheel; that is to say, if the one wheel is forced upwards from its normal position by encountering an obstacle, the other wheel is pressed downwards, with the result that the rear end of the vehicle is slightly raised. Where front and rear wheels are thus interconnected, the effect of the upward movement imparted to the front wheel is distributed to both springs so that only a part of that movement is transmitted to the front of the vehicle frame, the other part being operative to lift the rear end of the vehicle-frame; so that the total movement, being distributed over the whole frame, can be reduced in extent, or alternatively more flexible springs can be used.

Additional leaf-springs may be provided to serve as guides for the axles, and the interconnection aforesaid may be such as to transmit to the other springs a movement which is proportionately smaller, as the deflection of one spring is increased.

The invention further comprises the combination in a vehicle, with two sets of parts as set forth above, one set being situated on each side of the vehicle, of means interconnecting the said sets of parts whereby a displacement of one wheel, say, for example, a front wheel, tends to produce a displacement in the same direction of the corresponding wheel, that is to say, the other front wheel, on the other side of the vehicle; the two wheels at the other end of the vehicle receive a tendency to move together in the opposite direction.

When the invention is applied to a vehicle having semi-elliptic springs, one end of the forward spring and one end of the rear spring are each connected respectively to arms of bell-crank levers whereof the other arms are connected together by a tie-rod, cable or resilient tension device such as a spring. The bell-crank levers may be constructed each with an obtuse angle in order to give stability to the whole arrangement and the tie-member between the bell-crank levers may be connected to a rocking-lever or equivalent device extending across the frame to the corresponding parts on the other side of the vehicle.

This invention also covers a specific construction in which forward and rear cantilever springs are rigidly fixed to the vehicle frame and the interconnecting means aforesaid between the springs is constituted by a tie-member which is secured at its ends to the springs at or near the free ends thereof, and is guided intermediately of its ends to cause it to be inclined to the springs themselves at its connection with them. The tie-member connecting the springs may be itself resilient, and its guiding means may be constituted by radius-rods pivoted on the vehicle-frame, or by flexible springs which will give an equivalent effect.

According to another feature of this invention, the tie-member aforesaid is operatively engaged with a rocking-shaft or other device which extends across the vehicle and constitutes the interconnecting means between the spring mechanism on the two sides of the vehicle.

In the case of a vehicle in which the front and rear cantilever-springs are each pivoted on the vehicle-frame intermediate of its ends, the wheels being engaged by the forward end of the front spring and the rear end of the rear spring, the other ends of the cantilever springs, which are mutually adjacent one another, are connected respectively in accordance with this invention to the opposite ends of a rocking-lever which is pivoted intermediate of its ends.

The rocking-lever may be arranged with its arms inclined to one another so that each of them slopes from the pivot-point towards the spring to which it is connected, thereby providing more stability to the system. Also, the lever itself may be so constructed as to be resilient. The stability may be still further enhanced by the provision of a leaf- or other spring connected to the lever in such manner as to yieldingly hold it in its mean position; a similar effect may be obtained by leaf- or other springs operatively connected to the axles or the main cantilever springs in a similar manner.

With this arrangement the interconnection between the spring mechanism of the two sides of the vehicle may be effected according to another feature of this invention, by fixing the respective rocking-levers aforesaid on a single shaft extending across the vehicle-body.

The accompanying drawings, Figures 1 to 8, illustrate diagrammatically various arrangements of springs in accordance with this invention, but the invention is not limited to these particular arrangements. Thus, for example, a part of the construction shown in one figure may be combined with a part of a construction shown in another figure.

In said drawings:

Figure 1 shows one construction according to the invention comprising cantilever springs in the form each of a single leaf connected by interconnecting means comprising a resilient tie-member linked to the frame;

Figure 2 shows another construction comprising semi-elliptic springs, one half of each of which constitutes a cantilever spring and the other half of each of which constitutes a resilient radius rod, which semi-elliptic springs are connected by interconnecting means comprising bell-crank levers and a tension member linked to the frame;

Figure 3 shows another construction comprising cantilever springs similar to those shown in Figure 1 but reinforced by similar springs and interconnected by means comprising a bell-crank lever;

Figure 4 shows another construction applied to the two front wheels of a vehicle and comprising an inverted semi-elliptic spring whereof the ends are interconnected by means comprising bell-crank levers and a tension member;

Figure 5 shows another construction comprising two cantilever springs of different construction pivoted to the frame and connected together by an inextensible tension rod;

Figure 6 shows another construction comprising light springs of different construction connected together by inter-connecting means and an extensible tension rod;

Figure 7 ilustrates another construction similar to that shown in Figure 5, but having interconnecting means comprising a bell-crank lever; and Figure 8 shows a further construction similar to that shown in Figure 7 but comprising semi-elliptic springs connected together by means of a rocking lever arm mounted on the frame.

Like reference numerals designate similar parts throughout the several views.

Referring first to Figure 1, the vehicle-frame is indicated by the reference 10 and the front and rear axles by the references 11, 12 respectively. The axles are each mounted upon a cantilever-spring 13 which may be only a single leaf or plate and is rigidly fixed at one end 14 to the vehicle-frame and at the other end 15 to the axle. The springs are each preferably sloped downwardly from the frame to the axle with a reverse curvature, and it will be appreciated that with such an arrangement the spring-controlled movement of the axle is not a plain circular movement about the point 14 or such as is obtained when the axle is controlled by a rigid pivoted radius-rod. A tie-member 16 which may take the form of a coil-spring as shown in Figure 1, so as to be resilient, or may be inextensible, in which case it may take the form of a thin leaf of spring steel, or rod, is secured to the front axle 11 with the main spring 13, and this tie-member extends from the front axle rearwardly sloping downwards to a point determined by a strut-member 17. This may take the form of a spring or rigid radius-rod pivoted on the frame 10, or it may be constituted by a spring, whereof the flexibility allows the triangular structure 13, 16, 17 to yield and let the front axle 11 move relatively to the frame. From this strut-member 17 the tie-member 16 is continued rearwardly by a part 18 which may be resilient, as shown, or may be inextensible, and is connected at its rear end to a similar set of parts for the rear axle. Similar references are attached to the similar parts coupled to the rear axle, but in the case of the strut 17 a possible modification of the shape has been illustrated. Where the two members 18 are connected together at 19 they may engage an arm 20 (for example, by a hook-shaped end on each engaging a bush on the arm) which is mounted on a shaft which extends across the vehicle-frame and carries a similar arm similarly connected to a spring suspension on the other side of the vehicle, this latter being similar to that already described. These arms 20 may be of less length than the struts 17, to give stability to the system, and they need not be rigidly connected to the cross-shaft.

The member 17 which acts as a strut may be so disposed that it lies at an obtuse angle with the cantilever-spring 13, for the purpose of giving increased stability to the whole arrangement.

If the cantilever springs 13 are only single leaves, it may be considered desirable to provide a safety device, in case of breakage. This may take the form of a second leaf-spring secured to the axle and extending under the main spring 13 towards and close up to the frame in order to take the compressive load in the member; the free end of this spring is shackled to the end of another spring above the main spring and fixed to the frame, so that if the main spring breaks, the shackle will swing into a stable position in contact with the broken main spring and take the load.

Again, at the portion of the guide spring, adjacent to the abutment, which, in a parallel-section spring is the most highly-stressed portion, a safety device may be provided by fixing a covering sheath over this portion so that in the event of a breakage the spring—being subject to a compression force—cannot move out of position, and therefore by the abutment of the broken ends will still transmit the compressive load.

It will be seen that with the arrangement illustrated in Figure 1, if one of the front wheels of the vehicle meets an obstacle which causes it to rise, the triangular frame 13, 16, 17 is distorted as the axle rises and tension is put upon the member 18 and transmitted through it to the spring-mounting for the rear axle on the same side of it, the effect being a tendency to depress the rear wheel or, what is equivalent, raise the rear end of the vehicle-frame. The lifting movement which has been imparted to the front wheel is therefore distributed to both ends of the frame on that side of the vehicle so that the total movement of the vehicle-frame is approximately halved and fore-and-aft pitching of the frame is substantially eliminated. When the strut-member 17 makes an obtuse angle with the cantilever 13, movement of the axle 11 gives an increasing proportion of movement to the tension-member 18 and therefore an increasing resistance to the movement of the axle 11.

The interconnection of the spring systems on the two sides of the vehicle by the arms 20 and the cross-shaft whereto they are fixed ensures that the movement aforesaid of one front wheel is transmitted to the other side of the vehicle, tending to raise the other front wheel and depress the other rear wheel.

If it is desired, the arrangement illustrated in Figure 1 may have pivoted radius-rods associated with the axles to guide their movement, although this is not essential, as the rigid fastening of the cantilever-springs 13 to the vehicle-frame and the axle effectively restrains the axle against any movement laterally of the vehicle.

Figure 2 shows a modified arrangement in which the front and rear axles 11, 12 are supported on semi-elliptic springs which are interconnected by means of bell-crank levers 21, 22, and a tension-member 23. This tension-member may take the form of an inextensible rod, or it may be resilient. The bell-crank levers may each have their arms inclined to one another at an obtuse angle, so as to increase the stability of the whole system. A transverse shaft 24 may be used to interconnect the spring systems on the two sides of the vehicle, and the arm 25 connected to the tension-member 23 may be made somewhat shorter than the arms of the bell-crank levers 21, 22, also for the purpose of giving increased stability. Pivoted arms such as 25 may be used for the same purpose independently of the interconnection between the two sides of the vehicle. The action of this system of springing is exactly the same as that described above with reference to Figure 1, and need not be repeated.

Figure 3 shows another arrangement somewhat similar to that illustrated in Figure 1, but each of the cantilever-springs 13 which is attached to the upper side of an axle, is reinforced by a similar spring 26 attached to the lower side of the axle or in any other convenient manner and so mounted on the vehicle-frame 10 as to be substantially parallel with the spring 13. This arrangement ensures that the vertical axis of the axle receives a substantially parallel movement.

Another modification is also illustrated in this figure, in that the two tension-members 18, instead of being connected together and to a radius-arm 20, are connected to two arms of a bell-crank lever 27, 28, which may be mounted on a shaft 29 extending across the vehicle-frame. With this arrangement increased stability of the system is obtained since the turning effort exerted by tension of the member 18 on the arm 27 has a gradually decreasing moment, whereas the moment of the force acting on the arm 28 is simultaneously increased, and vice versa.

Figure 4 illustrates the application of this invention to two wheels at the same end of a vehicle the drawing illustrating the arrange for front wheels. An inverted semi-elliptic spring 30 rigidly secured to the vehicle-frame 10 has its ends coupled to bell-crank levers 31, 32 respectively, pivoted on brackets on opposite ends of the axle 33. The other arms of these bell-crank levers 34, 35 respectively are coupled to one another by a tension-member which may be inextensible or, as illustrated, may take the form of a tension-spring 36. If one wheel is displaced, say, upwards, by encountering an obstacle, say, the right-hand wheel, the corresponding half of the spring 30 is deflected as a cantilever-spring but the bell-crank lever 31, 34 is rocked on its pivot and transmits a pull through the member 36 to the other bell-crank lever 35, 32, which thereupon brings about a relative displacement of the left-hand wheel and its end of the spring 30, in the opposite direction. So far as these two wheels are concerned, the effect of the arrangement is the same as that illustrated in Figure 1. A radius-rod 37 may be pivoted on the frame 10 and connected to the mid-point of the tension-member 36, and this rod may be interconnected by means of a longitudinal shaft whereon it is fixed with a similar springing arrangement for the wheels at the other end of the vehicle.

It also lies within the scope of this invention to combine a spring-suspension such as illustrated in Figure 4, but without the interconnection between the front and rear wheels aforesaid, with a spring-suspension such as illustrated in Figure 1, but without the interconnection between the two sides of the vehicle.

Figure 5 illustrates yet another modification. The front and rear axles 11, 12 are each mounted upon cantilever-springs 38, 39 which are pivotally-connected to the vehicle-frame and have short arms 40, 41 coupled together by a tension-member 42. This tension-member may be inextensible like a rod, or may be resilient, as in the previously-described constructions. Also, it may be interconnected with the suspensions for the wheels on the other side of the vehicle. Alternatively, the interconnection between the two sides of the vehicle may be effected by making the cantilever-springs 38, 39 fast on their respective pivotal rods and extending these rods across the vehicle to carry the corresponding springs at the other side. In such an arrangement a single interconnecting member 42 may be used, this being operative in any convenient manner on the two cross-shafts, say on levers at the middle of the length of each shaft, or one on either side of the vehicle; similarly, the two springs 39 may be made fast on their pivotal rod which extends across the chassis and the remaining springs for the other axle connected to levers on this pivotal rod. Two different forms of cantilever-spring are illustrated; the spring 38 has its leaves extended and bent over to form the short arm 40 of the lever, whereas the spring 39 is mounted in a bracket having a rigid arm 41 to constitute the short arm of the lever. The guiding of the axle in a vertical plane may be further effected either by means of a single leaf-spring 43, as shown in the left-hand of Figure 5, this leaf-spring being rigidly secured at its ends to a bracket on the frame 10 and to the axle 11, or, as shown at the right-hand end of Figure 5, by extending one of the leaves of the spring 39 backwards, as shown at 44, and coupling it by a suitable shackle to the vehicle-frame. The guide-spring need not be only a single leaf for an increased number of leaves may be used with the object of increasing the stability of the system and providing that a reduced portion of the loading of one axle or wheel is transmitted to another axle or wheel.

This invention also covers constructions whereof one is illustrated in Figure 6 in which the springs are similar to those used in ordinary systems of springing and are constructed so lightly as to be incapable of themselves of withstanding the stresses to which they are subjected, but they are interconnected, in the manner hereinbefore described, by preferably resilient means which provides the additional strength that is required. In the arrangement illustrated the frame 10 is provided at the front with semi-elliptic springs 45 and at the rear with cantilever-springs 46, these being similar in arrangement to the kinds ordinarily used, but more lightly constructed. The axles are inter-connected by means of bell-crank levers 48, 49, and 50, 51, the arms 49, 51 being connected by a tension-spring 52. With this arrangement any displacement of, say the front axle 11 is resisted partly by the spring 45, partly by the tension-member 52, and partly by the spring 46, and at the same time the movement of the vehicle-frame is distributed instead of being concentrated at the front end. Whilst such an arrangement would operate even if the tension-member 52 were not resilient, it is preferred to make it resilient,.

Figure 7 illustrates a construction which essentially resembles that of Figure 5, but the cantilever-springs are of a slightly different construction. Instead of being connected together by a tension-member connecting short arms at the root ends of the cantilevers, the two springs 53, 54, which are pivotally connected to the frame 10, are extended towards one another, and their adjacent ends 55, 56 are connected by shackles to two arms 57, 58 of a rocking-lever pivoted at 59 on the vehicle-frame. The action of this system of springing is exactly the same as that described with reference to Figure 1 and it need not be repeated in detail. If desired, a flat leaf-spring 60 may be provided as in the manner hereinbefore described, to act as a guide to the axle in its vertical movement and the bell-crank lever 57, 58, may be controlled by a flat spring 61 secured on it and anchored at the other end to the vehicle frame 10. This spring tends to maintain the whole system in its mean position. Inter-connection between the springs on the two sides of the vehicle may be provided by means of a cross-shaft 59 to which the bell-crank levers 57, 58 on each side of the vehicle are connected.

Figure 8 shows an arrangement which is similar to Figure 7, except that semi-elliptic springs are used instead of cantilever-springs. The semi-elliptic springs 62, 63 are connected at their forward and rear ends respectively to the vehicle-frame in the usual manner, but their rear and forward ends respectively are shackled to a rocking-lever 64 which may have its arms inclined to one another to provide stability for the system. This lever may be interconnected by means of a cross-shaft 65 with a similar lever on the other side of the vehicle, and the action of this arrangement of springs is again similar to that of the arrangement previously-described.

In any of the foregoing constructions, wherever a limited pivotal movement is required this may be provided by a suitable arrangement of spring members in order to avoid the use of joints which require lubrication, such for example as a flat spring secured at one end to the vehicle-frame and at its other end to the main spring, the abutting surfaces of the two springs being formed with a slightly convex curvature.

In some constructions of motor vehicle, the frame-members are not parallel with one another but diverge towards the rear, and whilst the springs for the front wheels are parallel with one another, those for the rear wheels diverge towards the rear. The present invention may be applied to such constructions, since the tension-members, such as 18, on one side of the vehicle, need not necessarily be in line with one another, provided they are connected to a radius-member, such as 20 in Figure 1, or by other suitable means. Also, of course, the system can be applied to a two-wheeled vehicle, or to vehicles in which driving and braking are applied to more than two wheels, for the purpose of equalizing the loading on the wheels.

Additional leaf-springs substantially parallel to the main leaf-springs may be provided to an axle (or suitable radius-rods) with the object of providing a means of resisting the torque set up by either driving of braking loads.

Any of the constructions may be modified in detailed arrangement so that different types of springs may be employed. For example in the construction given in Figure 5, the spring levers 38, 40 or 39, 41 may be reversed so that the shorter arms extend in an upward direction and engage compression springs suitably arranged. Again, supplementary spiral springs may be arranged as an anchorage to the frame from any suitable portion of the moving mechanism in any of the constructions.

An important advantage pertaining to this invention is that whilst the flexibility of the spring suspension can be increased, as regards the displacement of a single wheel, the resistance to rolling of the frame, when both ends of one side of the vehicle are similarly and simultaneously affected need not be diminished, and the same applies to "bouncing", when both axles move similarly and simultaneously.

It will be seen that the present invention provides a system of springing whereby the spring-controlled displacements of a wheel are transmitted to the vehicle-frame in such a manner that the frame remains approximately level even if only one wheel be displaced; as a result of this, the vertical movement of the frame is considerably reduced, and less power is required to propel the car, since the mass moves more nearly in a straight line than with known springing systems. In all the cases where single leaf-springs are used, the springs are frictionless in operation and are very sensitive to irregularities in the road-surface. There is no necessity for lubricating the springs, and they can be painted with the frames and are easily washed and kept clean. Also, the springs can be designed to have an increased period of vibration without making them unduly long. Finally, owing to the displacement of any one wheel being distributed over the whole frame, the frame itself is not racked or twisted to the extent that is ordinarily obtained.

What I claim as my invention and desire to secure by Letters Patent is:—

1. In a vehicle, the combination with a main frame, of a wheel-carrying axle, a spring operatively interposed between said axle and said frame, a second wheel-carrying axle, a second spring operatively interposed between said second axle and said frame, and means comprising two lever arms pivoted on said frame and operatively connected together at one end, each lever arm being associated with one of said springs, said lever arms being so inclined with respect to each other, and being so disposed with respect to the frame and the springs that displacement of one axle tends to produce a progressively varying and opposite displacement of the other axle.

2. In a vehicle, the combination with a main frame, of a wheel-carrying axle, a spring operatively interposed between said axle and said frame, a second wheel-carrying axle, a second spring operatively interposed between said second axle and said frame, means comprising a bell crank lever pivoted on said frame, each arm of said lever being connected with one of said springs, said arms being so inclined with respect to each other, and being so disposed with respect to the frame and the springs that displacement of one axle tends to produce a progressively varying and opposite displacement of the other axle, and means engaging said lever and tending to maintain the latter in one position.

In testimony whereof I affix my signature.

JOHN FIFIELD ADYE.